S. CURTIS & E. H. ROWLEY.
Ladle.

No. 165,071.  Patented June 29, 1875.

Witnesses
John Becker
Fred. Haynes

Stephen Curtis
Edwin H. Rowley
by their Attorneys
Brown & Allen

UNITED STATES PATENT OFFICE.

STEPHEN CURTIS AND EDWIN H. ROWLEY, OF NEW YORK, N. Y.

IMPROVEMENT IN LADLES.

Specification forming part of Letters Patent No. 165,071, dated June 29, 1875; application filed November 2, 1874.

*To all whom it may concern:*

Be it known that we, STEPHEN CURTIS and EDWIN H. ROWLEY, both of the city, county, and State of New York, have invented a new and useful Improvement in Ladles; and we do hereby declare that the following is a full, clear, and exact description thereof, reference being had to the accompanying drawing, making part of this specification.

This invention has for its object to furnish a strong, durable, and attractive ladle, which will not corrode or tarnish, and possesses many advantages over the ordinary ladle constructed of britannia or other soft metal; and our invention consists of a ladle composed of a bowl constructed of an internally-enameled lining or body of hard metal to retain its shape, and an external covering of soft metal spun over and upon the lining or body, and secured thereon by bending its upper edge down over the edge of the lining-piece and enameled lining, all of which will be fully hereinafter described.

Figure 1:
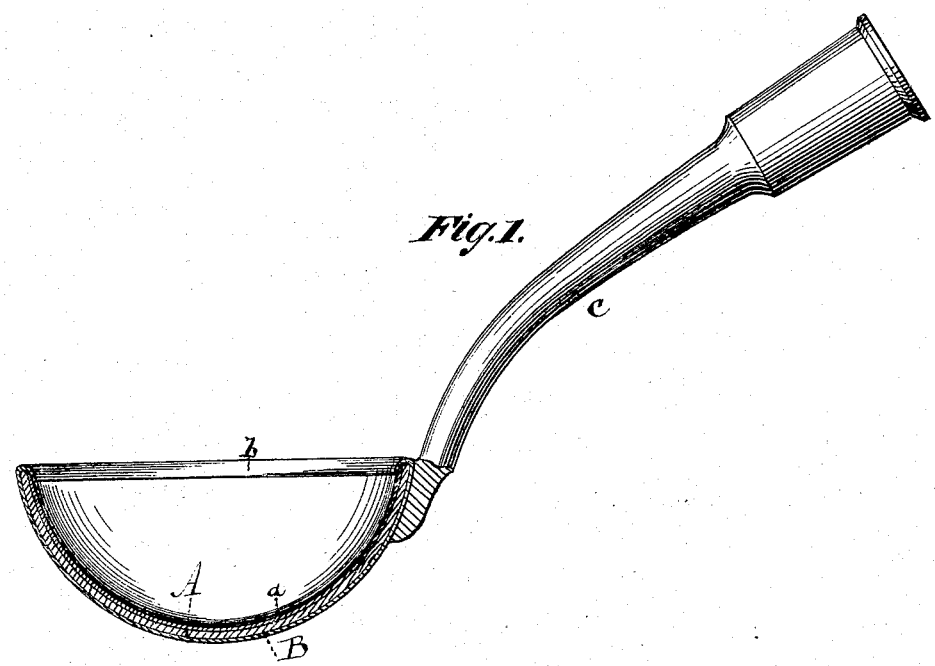
Figure 2:
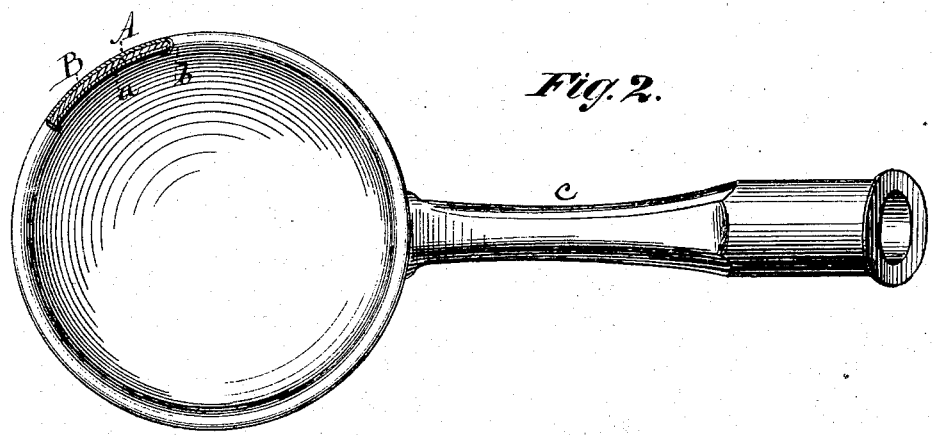

In the accompanying drawing, Figure 1 is a sectional view of our improved ladle. Fig. 2 is a top view.

The bowl of the ladle is composed of a lining-piece, A, and an external covering, B, and the handle $c$ is or may be attached to the bowl by soldering or in any suitable manner. The lining-piece A is made of iron, or other hard metal which will retain the proper shape and not be easily battered or dented. It may be of cast-iron or of wrought-iron, stamped into shape, and it is enameled on its concave or inner surface, as shown at $a$. The external covering B is made of britannia or other suitable soft, light metal, and is spun over the back of the lining-piece A, and secured by turning down its edges $b$ over the edges of the hard lining-piece and enameled lining, as shown in Fig. 1. After the bowl is thus formed, the handle $c$ is attached by soldering or in any other suitable manner. The bowl of the ladle thus constructed is stronger and more durable than one made entirely of soft metal, and will retain its shape and not be easily battered, bent, or dented, and yet will present a neat appearance, and may be made and sold at small cost.

We design that our invention be restricted strictly to the manufacture of ladles, as specifically pointed out hereinbefore, and we do not wish to be understood as claiming, broadly, articles formed of hard metal, "dry-plated" with soft metal, to which an ornamental polish is imparted.

What we claim as new, and desire to secure by Letters Patent, is—

As an article of manufacture, a ladle consisting of a bowl of an internally-enameled lining or body of hard metal to retain its proper shape, and an external covering of soft metal spun over and upon the lining or body, and secured thereon by bending its upper edge down over the edge of the lining-piece and enameled lining, as and for the purpose herein shown and described.

STEPHEN CURTIS.
EDWIN H. ROWLEY.

Witnesses:
MICHAEL RYAN,
FRED. HAYNES.